United States Patent [19]
Roller

[11] 3,951,752
[45] Apr. 20, 1976

[54] METHOD AND APPARATUS FOR CONVERTING SALINE WATER TO FRESH WATER

[76] Inventor: Paul S. Roller, 1341 G St., NW. (Room 825), Washington, D.C. 20005

[22] Filed: Aug. 13, 1973

[21] Appl. No.: 387,585

Related U.S. Application Data

[63] Continuation-in-part of Ser. No. 531,278, June 3, 1966, abandoned, and a continuation-in-part of Ser. No. 834,203, March 15, 1969, abandoned.

[52] U.S. Cl. ............... 203/7; 203/11; 203/22; 203/23; 203/24; 203/27; 203/79; 203/88; 203/100; 202/173; 202/174; 202/177; 202/233; 159/16 S; 159/45; 159/47 R; 159/DIG. 8; 159/DIG. 13
[51] Int. Cl. ............... B01d 3/00; B01d 3/06; B01d 3/10; B01d 3/02
[58] Field of Search ............... 159/DIG. 8, 45, 16 S, 159/47 R, DIG. 13; 202/173, 174, 177, 180, 233, 234; 203/7, 10, 11, 23, 26, 27, 79, 88, 92, 100; 23/301 R

[56] References Cited
UNITED STATES PATENTS

| | | | |
|---|---|---|---|
| 2,979,442 | 4/1961 | Badger | 203/7 |
| 3,026,261 | 3/1962 | Mayfield et al. | 159/47 R X |
| 3,119,752 | 1/1964 | Checkovitch | 203/11 |
| 3,218,241 | 11/1965 | Checkovitch | 203/88 X |
| 3,389,059 | 6/1968 | Goeldner | 203/7 X |
| 3,399,975 | 9/1968 | Otten | 203/7 X |
| 3,420,775 | 1/1969 | Cadwallader | 203/7 X |
| 3,476,654 | 11/1969 | Sieder | 202/173 X |
| 3,607,666 | 9/1971 | Roller | 203/7 |

FOREIGN PATENTS OR APPLICATIONS
1,028,516   5/1966   United Kingdom ............ 159/DIG. 8

OTHER PUBLICATIONS

A, F, G Teach seeding of brine and G with anhydrite. B shows vapor compression of saline vapors and treatment of saline with anhydrite. D is similar to C, E treats saline water with acid and phosphate. I removes $CO_2$ and adds same to saline. L shows a multistage flash-multiple effect evaporator.

*Primary Examiner*—Jack Sofer

[57] ABSTRACT

Saline water, typically sea water or brackish water, after deaeration and deoxygenation is preheated, then further heated by steam condensing with the preheated saline water. By the further heating, bicarbonates are thermally decomposed, forming carbon dioxide, while scale compounds, comprising magnesium hydroxide, anhydrite and minor compounds containing silica, iron, alumina, phosphate, etc., are thermally precipitated. Some of the steam is uncondensed and issues from the further heated saline water with included, evolved carbon dioxide. It is condensed in preheating saline water; evolved carbon dioxide is separated from the condensate and recycled to the saline water to prevent alkaline scale in preheating, while condensate is combined with the further heated saline water, forming post-thermal saline water. This is flash vaporized while cooling and the steam is regenerated by compressing the flashed vapors. Cooled, post-thermal saline water is evaporated preferably in a vapor compression evaporator to form fresh water and saline water residuum.

21 Claims, 1 Drawing Figure

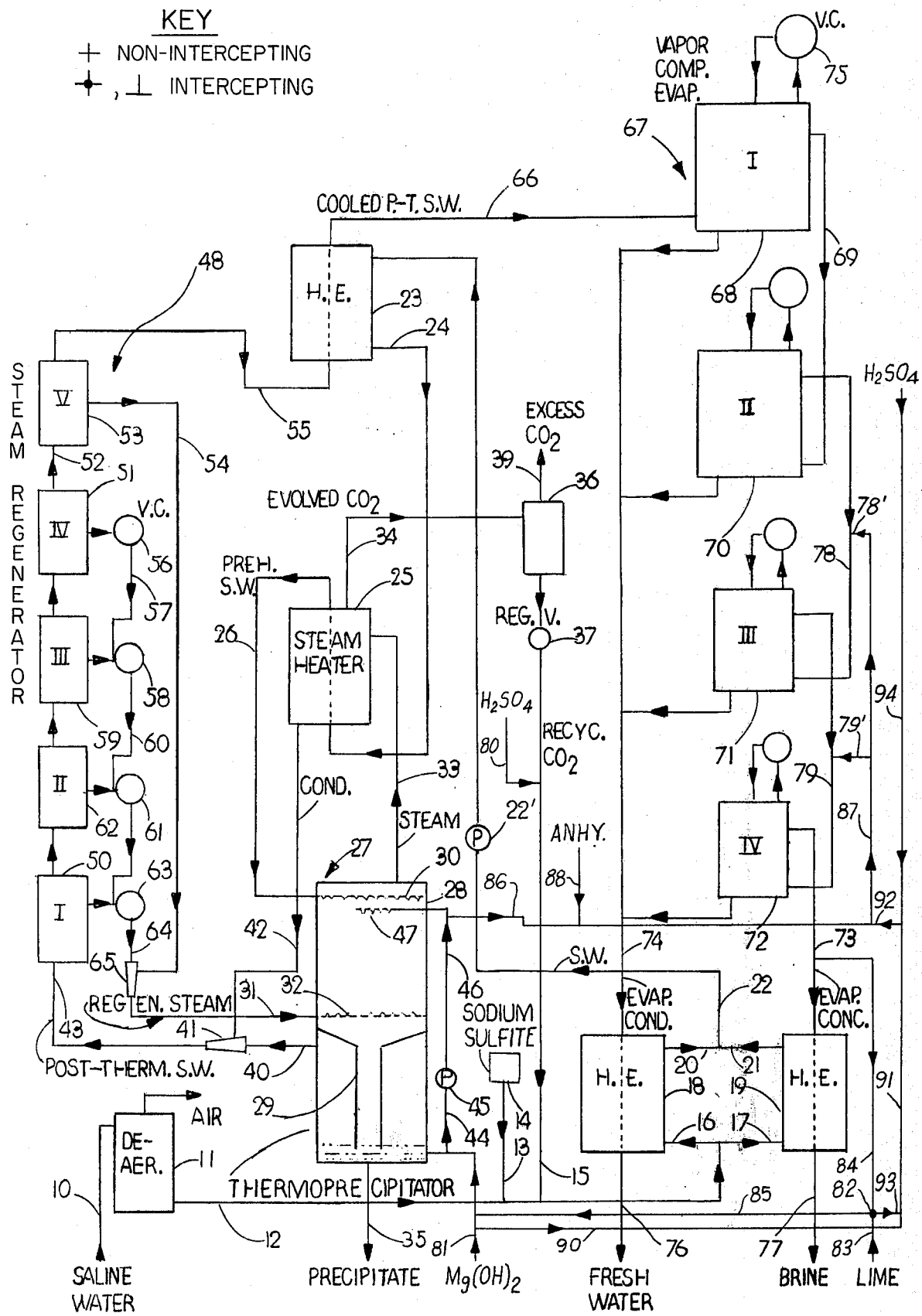

METHOD AND APPARATUS FOR CONVERTING SALINE WATER TO FRESH WATER

This application is a continuation-in-part of my former applications, Ser. No. 531,278 and 834,203, both now abandoned. Subject matter of these applications not included herein is incorporated by reference.

The invention relates to the evaporative conversion of saline water wherein it is processed with steam before its evaporation to form fresh water and saline water residuum.

Saline water characteristically contains compounds that form scale in evaporation. These comprise chiefly bicarbonates of calcium and magnesium, carbonate being necessarily negligible in the presence of these cations, calcium sulfate, and minor scale-forming compounds containing silica, iron, alumina, phosphate, etc. Sea water and brackish water are typical; other examples are process or waste waters that form scale in evaporation and are more or less saline, such as pulp-mill liquors, sewerage, etc.

Industrial evaporation, outstandingly multiple effect or vapor compression evaporation, involves heat transfer from condensing vapor to evaporating liquid. It is inherently economical because of cyclic re-use of the vapor. Its application extends to sea water and other strong saline waters, in contrast to membrane-based methods of reverse osmosis and electrodialysis, which have been confined to brackish and other ionically weak waters.

Nevertheless, despite its great potential, evaporation as traditionally understood, or heat exchange evaporation as it may be called, has proved not to be broadly feasible, because of scale formation on the heat exchange surfaces. After innumerable attempts to overcome this, in recent years a shift has been made to another mode of evaporation, multistage flash evaporation, which avoids heat transfer in evaporation, and hence avoids the possibility of related scaling. The heat required for evaporation is obtained by internal cooling. Since the corresponding temperature drop is limited, the recovery of fresh water is low per unit weight of saline water; in the instance of sea water, the recovery of fresh water is no more than 16%–17%; large quantities of sea water must, therefore, be processed for a given quantity of fresh water, and the cost is correspondingly high. In heat exchange evaporation, on the other hand, recovery may reach to almost 100%, and the sea water to be processed is little more than the fresh water recovered.

It is an object of the invention to provide for heat exchange evaporation of saline water and an economically high recovery of fresh water.

Another object is to provide for evaporation subsequent to the elimination of scale-forming compounds by thermal precipitation employing steam.

A further object is to provide for evaporation subsequent to elimination thermally of gases from the saline water.

Another object is to provide for regenerating steam employed in the thermal precipitation.

Still another object is to provide for the utilization of carbon dioxide evolved in the thermal precipitation.

A still further object is to provide for seeding of the thermal precipitation.

Another object is to provide for a temperature differential in heat transfer.

A further object is to provide for sustained deoxygenation of the saline water.

With these and other objects in mind, as will become apparent as the description proceeds, reference is made to the drawing, in which:

The FIGURE is a diagrammatic view of an apparatus according to the invention.

In the drawing, lines connecting principal parts of the apparatus represent conduits and arrow-heads thereon the direction of fluid flow.

The description which follows relates to saline water in general; in that respect, quantities and temperatures are approximate. For greater definition, but without limitation thereto, the numbers relate specifically to sea water, and for that reason, sea water, rather than saline water, is named in detailing the process, except as otherwise noted, or obvious.

A reference quantity of 1000 lb. of sea water, entered in line 10 at above atmospheric pressure and at a reference temperature of 65°F, passes to deaerator 11, and exits deaerated at this temperature in line 12. Deaeration may be effected at a higher temperature, up to about 160°F, by antecedently preheating the sea water, for example by diverting it from subsequent heat exchangers 18 and 19.

While in line 12, from communicating line 13 and container 14 the sea water receives a deoxygenating agent, typically sodium sulfite at a dosage of about 2.8 ppm (parts per million of sea water); from communicating line 15, about 60 ppm of carbon dioxide is recycled to the sea water, upon which its pH is reduced to 6.4. The recycled carbon dioxide present in solution in the sea water prevents alkaline scaling in subsequent preheat. For the same purpose, alternately about 35 ppm sulfuric acid may be added, the pH then being reduced to 6.5.

The deoxygenation is important for counteracting corrosion in preheating, notwithstanding the decreased pH. The deoxygenation is sustained in the sea water, since the pressure is greater than atmospheric constantly to the end.

The treated sea water passes from line 12 in split stream thorough lines 16 and 17, respectively to heat exchangers 18 and 19; exiting in lines 20 and 21, the streams are recombined in line 22 at a temperature of 210°F. Boosted to somewhat above 82 ps;g by pump 22' in line 22, the sea water passes therein to heat exchanger 23 in which it is further preheated to 255°F; exiting in line 24 to steam heater 25, it is finally preheated to 260°F, at which it passes to thermoprecipitation.

Though a preheat temperature of 250°F is specified for sea water in multistage flash evaporation, a preheat temperature of 260°F conforms to the once-through flow employed in the process.

Thermoprecipitator 27 comprises chiefly vessel 28, in the upper part of which the thermoprecipitation reactions occur, and included compartment 29 which, situated centrally in the lower part of vessel 28, is an assist in separation of the precipitate that is formed. Compartment 29 is open at both ends, the upper of which is flared and sealed at its edge to the inner wall of vessel 28.

The preheated sea water enters thermoprecipitator 27 from line 26 and distributor 30, which is situated at the upper end of vessel 28 and is surrounded by vapor, or alternately is immersed in liquid. Opposed to the 1000 lb. of preheated sea water at 260°F, is 73 lb. of saturated steam at 325°F entering from below through line 31 and distributor 32, which, immersed in the liquid, is situated just above compartment 29. As the steam rises, it condenses in the sea water, therewith further heating it from 260°F to a final temperature of 320°F, at which, augmented in weight to 1067.7 lb. by the steam condensate, the further heated sea water flows past distributor 32 into compartment 29 together with suspended precipitate.

During the further heating, bicarbonates in the sea water are thermally decomposed, forming carbon dioxide and precipitating magnesium hydroxide; other scale compounds thermally precipitated are anhydrite and minor ones containing silica, iron, alumina, phosphate, etc., forming with the precipitated magnesium hydroxide a total precipitate of scale compounds. The presence of magnesium hydroxide favors compound formation by silica. Calcium carbonate, an alkaline scale compound derived from bicarbonate decomposition and alternate to alkaline scale compound magnesium hydroxide, is unfavored at the prevailing high temperatures and low partial pressure of carbon dioxide in the presence of instant uncondensed steam.

The partial pressure of carbon dioxide is less than $5 \times 10^{-4}$ atm. at a point just above distributor 32, and the temperature being 320°F, the magnesium hydroxide precipitated is practically 100% of that possible. The partial pressure of carbon dioxide at the upper end of vessel 28 is sufficiently low that appreciable precipitation of magnesium hydroxide occurs at the entering preheat temperature of 260°F. Anhydrite is precipitated to the extent of about 60% of the maximum at the final temperature of 320°F.

Of the initial 73 lb. of steam, 5.3 lb. or 7% issues uncondensed from thermoprecipitator 27. Its temperature is 265°F, or 5°F above that of the preheated sea water with which it is in contact. The uncondensed steam includes 160 ppm of evolved carbon dioxide, comprising 100 ppm formed in the thermal decomposition and 60 ppm recycled.

The uncondensed steam with included, evolved carbon dioxide exits in line 33 to steam heater 25; it condenses herein while preheating sea water to 260°F and forming condensate at this temperature. Separating from the condensate, the evolved carbon dioxide passes into line 34 to container 36, in which it is collected. A portion of the collected carbon dioxide is recycled through regulating valve 37 and line 15 to the sea water in aforesaid line 12; the excess evolved carbon dioxide may be discharged as called for through line 39.

The existence of an excess of evolved carbon dioxide, disclosed in my U.S. Pat. No. 3,607,666, obviates the need for supplementary carbon dioxide, as heretofore assumed by the art. The excess carries off with it nitrogen and other gas residuals, which, therefore, may not accumulate on recycling, beyond an acceptable small limit. Recycling of evolved carbon dioxide is, accordingly, made feasible.

Alternately, the evolved carbon dioxide may be wasted through line 34, or treated as by-product in container 36. In that case, sulfuric acid may be employed instead of evolved carbon dioxide to prevent alkaline scale in preheat as expressed hereinabove, the sulfuric acid passing from line 80 to line 15 and thence to line 12 through which the sea water to be preheated passes.

The further heated sea water in compartment 29 reverses its direction of flow at the bottom thereof, upon which the suspended precipitate separates and settles in vessel 28 near the bottom edge of said compartment. Flowing upward in the annular space between vessel 28 and compartment 29, further heated sea water exits, now clarified, in line 40. Passing into eductor 41, it entrains and combines with 5.3 lb. of the condensate of steam heater 25, which will have flowed to said eductor through line 42, and a total of 1073 lb. of post-thermal sea water issues into line 43 substantially at 320°F.

From the bottom of vessel 28, separated precipitate, composed chiefly of 0.066 lb. of magnesium hydroxide and 0.80 lb. of anhydrite, is discharged, as it accumulates, through line 35.

The rate of precipitation in thermoprecipitator 27 is intrinsically high, in view of the comparatively high temperatures ranging up to 320°F, and in view, further, of the agitation created by the condensing steam. The rate may be augmented by seeding the precipitation, conveniently with separated precipitate, in which case this is recirculated to the further heating sea water through a loop including line 44, recirculating pump 45, line 46 and distributor 47 situated near sea water distributor 30.

The proportion of magnesium hydroxide in the separated precipitate being small, that in recirculation may be supplemented by magnesium hydroxide acquired independently, or by utilizing the magnesium salts in evaporated saline water. In the former case, magnesium hydroxide is passed from line 81 successively to line 44, pump 45 and distributor 47. In the latter case, lime or other alkali from line 83 is added at point 82 to sea water evaporator concentrate in line 84 connected to line 73, and the magnesium hydroxide precipitated is combined with recirculating precipitate in line 44 on the suction side of pump 45.

The steam that is condensed in the post-thermal saline water is regenerated, by heating under pressure the vapors that are flashed in flash vaporizing post-thermal saline water while it is thereupon cooling. The heating under pressure is preferably constituted by isentropically compressing the flashed vapors; and more particularly, in multistage flash evaporation of the post-thermal saline water, by cascade compressing the multiple flashed vapors.

Illustrative of the apparatus employed in the instance of sea water, steam regenerator 48 comprises five stages of multistage flash vaporization, numbered I at the highest temperature sequentially to V at the lowest. The chambers of stages I to IV, in which the sea water is incompletely flash evaporated while cooling, are each provided with a connected vapor compressor, which, however, is omitted from stage V. From line 43 post-thermal sea water enters chamber 50 of stage I. Flash evaporated therein while cooling, it passes to chamber 62 of stage II, and similarly in sequence to the chambers of stages III and IV. From chamber 51 of stage IV, inasmuch as 46 lb. of vapor will have been flashed, a remainder of 1027 lb. of sea water, cooled from an initial temperature of 320°F to 285°F, passes into line 52 to chamber 53 of stage V. Flash vaporization herein is completed, and 1000 lb. of post-thermal sea water, cooled to 260°F, exits into line 55; concurrently, 27 lb. of vapor, likewise at a temperature of 260°F, is flashed into line 54.

Descriptive of cascade compression of the multiple flashed vapors, from chamber 51 of stage IV, vapor is flashed to vapor compressor 56 of that stage. It passes compressed into line 57, and is thence cascaded to the vapor which is flashed from chamber 59 of sequential stage III, at the same pressure as that at the exits of of compressor 56 of stage IV; and the combined vapor issues to vapor compressor 58 of stage III. Compressed, it passes into line 60, and is cascaded to the vapor which is flashed from chamber 62 of stage II, at the same pressure as that at the exits of of compressor 58 of stage III; and the combined vapor issues to vapor compressor 61 of stage II, is compressed and cascaded to the vapor flashed from chamber 50 of stage I. From compressor 63 of that stage, cascade compressed vapor passes into line 64 as superheated vapor at a saturation temperature of 325°F.

The superheated vapor may comprise regenerated steam; however, saturated steam, which yields latent heat instantly to the saline water, generally is preferred. In transforming the superheated vapor into saturated vapor, it passes from line 64 into steam injector 65, in which it entrains the vapor from line 54, which is flashed from chamber 53 of stage V. The superheated vapor is desuperheated, and the combined vapor, increased from 46 lb. to 73 lb. and saturated at 325°F, passes into line 31 as regenerated steam for recycling to thermoprecipitator 27.

Efficiency of the vapor compressors comports with a low compression ratio. Multistaging of the steam regenerator results in a great reduction in compression ratio compared to a single stage. The compression ratio of the vapor compressors of stages I to IV of steam regenerator 48, which is the same for each, is a low 1.16. The energy required in vapor compression is also greatly reduced, being for the four stages but 60% of that for a single stage.

Having considered conjoint steam regenerator 48, thermoprecipitator 27 may be reconsidered on the basis of alternately all of the steam being condensed therein, as set forth in my aforesaid, former applications, one of which provides also for recycling of the evolved carbon dioxide. Despite the absence of uncondensed steam utilized therein, steam heater 25 is desirably retained. The steam for it may be derived from steam regenerator 48 by arranging stage V in multistage and detaching vapor flashed at 265°F to provide the steam for said steam heater.

The cooled, post-thermal sea water at a temperature of 260°F in line 55 is similar in quantity and composition to the original sea water, but is greatly relieved of scale-forming compounds; it is also free of gas residuals, which while recycled with the evolved carbon dioxide, will have been later released during flash vaporization in steam regenerator 48. The cooled post-thermal sea water is, therefore, exceedingly well adapted to extensive heat exchange evaporation to produce fresh water, by condensation of the vapor formed, and sea water residuum. While a multiple effect evaporator is suitable for the purpose, a vapor compression evaporator is preferred, because it is compact, inherently economical and is consistent with the employment of vapor compression in steam regenerator 48.

In preparation for vapor compression evaporation, the cooled, post-thermal sea water is further cooled to a temperature at which hemihydrate tends to crystallize in evaporation instead of stable but supersaturative anhydrite. From line 55, the post-thermal sea water passes at 260°F to heat exchanger 23, in which it preheats sea water countercurrently at a 5°F temperature differential to 255°F, and exits in line 66 at 215°F to vapor compression evaporation.

Vapor compression evaporation 67 comprises four stages, numbered I to IV in order of increasing sea water concentration in evaporation. Each stage includes an evaporation chamber and a connected vapor compressor. Vapor which has been compressed and is at increased temperature is cycled from compressor to its communicating chamber. It condenses therein while transferring heat indirectly to the evaporating sea water; the heat transfer differential is equal to a base value plus the mean boiling point elevation of the sea water in the chamber. Sea water concentrate flows sequentially from the chamber of stage I through the chamber of stage IV, from which it exits as evaporator concentrate. The condensates of the chambers are combined to form evaporator condensate; this is cooled to form fresh water, while the evaporator concentrate is cooled to form sea water residuum or brine.

While discussed with reference to sea water, the multistage arrangement is similarly applicable to other saline waters. The number of stages may be increased with increase in salinity, and decreased in the case of brackish or weak saline waters.

Considering the evaporation more explicitly, from line 66 the post-thermal sea water enters chamber 68 of stage I; and 400 lb. are evaporated and the vapor condensed, while 600 lb. of sea water concentrate issue into line 69 to chamber 70 of stage II. Herein 333 lb. are condensed, while 267 lb. of vapor sea water of concentrate issue into line 78 to chamber 71 of stage III. Similarly and in short, 83 lb. and 50 lb. of condensate are formed, respectively in chamber 71 of stage III and chamber 72 of stage IV; from chamber 71 of stage III, 250 lb. of sea water concentrate issue into line 79, and finally from chamber 72 of stage IV, 200 lb. of evaporator concentrate exit into line 73. The vapor condensates in each of said chambers are collected to a total of 800 lb. in line 74.

The evaporator condensate in line 74 passes to heat exchanger 18; and, in counterflow, preheating sea water, exits as 800 lb. of fresh water in line 76, at a recovery of 80%. The evaporator concentrate in line 73 passes to heat exchanger 19, and similarly preheating sea water, exits as 200 lb. of sea water residuum or brine in line 77, at a concentration factor of 5 relative to the original sea water.

In view of the heat produced by the vapor compressors, the temperature of evaporator condensate in line 74 is 222.2°F, or 7.2°F greater than that of 215°F for the post-thermal sea water at entrance. The temperature differential in heat exchanger 18 is, therefore, 12.2°F, and the temperature of the fresh water in line 76 is 77.2°F. Likewise, the temperature of evaporator concentrate in line 73 is 220.8°F, or 5.8°F greater than that at entrance; the temperature differential in heat exchanger 19 is, therefore, 10.8°F, and the brine in line 77 is at 75.8°F. These temperature differentials are 2 to 2½ times greater than the 5°F obtaining in the other heat exchange steps of the process; which is desirable, since it counteracts the relatively low temperatures and low heat transfer coefficients in heat exchangers 18 and 19.

Referring to stages I to IV of vapor compression evaporator 67, the concentration factors of the sea water concentrates are respectively, 1.67, 3.0, 4.0 and 5.0; and the compression ratios of the vapor compressors, 1.09, 1.12, 1.18 and 1.24.

The multistaging of vapor compression evaporator 67 results in a decrease in the energy required in vapor compression of nearly 10%. A comparable advantage is the control exercisable at the higher concentrations at which anhydrite tends increasingly to desupersaturate. This is of concern at concentration factors greater than 3, and therefore, in particular, with respect to stages III and IV. However, the volume of condensate in these stages is relatively small, which greatly simplifies their control.

The control may be made positive by effecting body crystallization of anhydrite in stages III or IV, and therewith circumventing anhydrite scaling on the heat exchange surfaces of these stages. Seed for the body crystallization may be provided by the separated precipitate in thermoprecipitator 27, inasmuch as this contains over 90% anhydrite. A portion may be passed form line 46, at the pressure prevailing therein, to line 86 followed by line 87 and thence through lines 78' and 78 to chamber 71 and through lines 79' and 79 to chamber 72. Alternately, the seed may be provided by anhydrite itself passing from line 88 to line 86 and thereafter to chambers 71 and 72 as described.

At the higher concentrations, and again in particular with respect to stages III and IV, magnesium salts may hydrolyze, with accompanying precipitation of magnesium hydroxide. In the separated precipitate employed for anhydrite seeding of the sea water concentrate in chambers 71 and 72 as described, the magnesium hydroxide, although small in content, may, nevertheless, be employable for seeding of the hydrolytic precipitate therein. Alternately, magnesium hydroxide itself may be employed, passing from line 81 to line 90 and then in succession through lines 91 and 92 to line 87, thence to chambers 71 and 72 as before described. Alternately, the magnesium hydroxide, prepared from lime and evaporator concentrate as above described, may be employed. It may be passed from point 82 to line 93 and thence in succession through lines 91, 92 and 87 to chambers 71 and 72. As another alternative, sulfuric or other acid in amount less than about 1 ppm, may be added, passing from line 94 to line 92 and line 87, thence to chambers 71 and 72, whereby to prevent the hydrolysis, and precipitation of magnesium hydroxide therein.

The process has important advantages as to apparatus and cost of producing fresh water. In regard to apparatus, the volume of saline water to be handled per unit volume of fresh water produced is, at 80% recovery for sea water, 1.25, and at 95% recovery for brackish water, 1.05. In contrast, at the 16%–17% recovery in multistage flash evaporation, the volume is 6.0 or 5–6 times as great as herein. The volume of vapor to be handled in evaporation is also comparatively low, in view of the temperature being 215°F or above. Moreover, corrosivity of the apparatus is managably minimal, in view of the sustained deoxygenation under the condition of superatmospheric pressure throughout.

Low cost of material is favored, also, by the high recovery. Per 1000 gal. fresh water, at a recovery of 80% the 2.8 ppm sodium sulfite corresponds to a requirement of but 0.029 lb. Were sulfuric acid to be employed, alternately to recycled carbon dioxide, the 35 ppm thereof would correspond to a requirement of but 0.37 lb. Countering the one or both costs, is the likely by-product value of 5-fold concentrated sea water; and, in large scale desalination, possibly also the separated precipitate of mostly anhydrite, and the excess evolved carbon dioxide.

Energy required is a paramount factor of cost. Expressed appropriately in units of kwh/1000 gal. fresh water, and considered with respect to sea water or brackish water, the energy required comprises three principal terms: that in vapor compression evaporation, in steam regeneration and in pumping saline water; individual values will be given in that order and in all instances at a vapor compressor efficiency of 80%.

In the case of sea water, under the conditions hereinabove denoted and a fresh water recovery of 80%, the magnitude of said principal energy terms are, respectively: 27.5, 7.0 and 1.3, to a total of 35.8 kwh/1000 gal. With the fresh water recovery reduced to 67% and, correspondingly, the post-thermal temperature to 300°F, the number of stages in steam regeneration to four, and in vapor compression evaporation to two, the magnitudes are: 19.9, 5.1 and 1.1, to a total of 26.1 kwh/1000 gal., or about 75% of that at the higher recovery.

In the case of brackish water, the preheat temperature often may be increased to 280°F, resulting in a marked decrease in the energy of steam regeneration, together with a reduction in the number of stages to three. Evaporation may be carried out to a high recovery, without excessive boiling point elevation; the energy of evaporation is correspondingly decreased, and the number of stages reduced to one or two.

As an example, in the instance of brackish water having a salinity between 3000 and 6000 ppm, with evaporation carried out to a brine salinity of 80,000 ppm, or more than twice that of sea water, the recovery of fresh water is about 95%. The magnitudes of the energy terms are, respectively: 18.6, 1.2 and 1.1, to a total of 20.9 kwh/1000 gal., which may be compared to 35.8 kwh/1000 gal. for sea water at the lesser recovery of 80%. The energy of evaporation, which predominates, would be less by about 15% were there no boiling point elevation at the 80,000 ppm brine salinity.

It is evident that both for sea water and brackish water the stated energy requirements signify an exceptionally low cost of fresh water.

Since the energy is absorbed in driving the compressors and pumps, the process is electrically based, and so is particularly pertinent to hydroelectric, nuclear, gasified coal and other types of electric power plant.

Having thus described my invention, it will be recognized that adaptations may be made, which will fall within the spirit and scope of the invention, as claimed.

What I claim is:

1. A process for the conversion of saline water containing scale-forming compounds, which comprises indirectly preheating the saline water; passing steam through preheated saline water and condensing a part of the steam in direct contact with the preheated saline water, thereby further heating it, while issuing another part of the steam uncondensed; as a result of the further heating, thermally decomposing bicarbonates in the saline water and thereupon precipitating alkaline scale compounds, while liberating carbon dioxide, and precipitating also calcium sulfate as anhydrite and other scale compounds, thereupon forming a total precipitate of scale compounds; expelling carbon dioxide by including it in the issuing, uncondensed steam; separating said precipitate of scale compounds from the further heated saline water, thus forming clarified saline water and separated precipitate; indirectly condensing the issued steam and forming condensate thereof, while evolving the included carbon dioxide; combining said condensate with the clarified saline water, to give post-thermal saline water; flash vaporizing the post-thermal saline water, and thereupon forming vapor and cooled post-thermal saline water; heating said vapor under pressure and thereby forming regenerated steam for employment as steam for said further heating; and evaporating said cooled, post-thermal saline water to produce fresh water and saline water residuum.

2. Claim 1, in which heating of said vapor under pressure is comprised in isentropically compressing the vapor.

3. The subject matter of claim 1, wherein the issued steam, while indirectly condensing, preheats saline water.

4. The subject matter of claim 1, wherein the saline water to be preheated is deaerated and deoxygenated.

5. Claim 4, in which said before mentioned evolved carbon dioxide is passed to the saline water to be preheated, whereby alkaline scale in preheating is prevented and corrosion is counteracted.

6. Claim 4, in which sulfuric acid is added in place of evolved carbon dioxide to the saline water to be preheated, whereby alkaline scale in preheating is prevented and corrosion is counteracted.

7. Claim 1, wherein said separated precipitate of scale compounds is recirculated to the further heating saline water, whereby to seed the precipitation.

8. Claim 7, in which magnesium hydroxide is combined with said recirculating separated precipitate.

9. Claim 8, in which said magnesium hydroxide is produced by adding lime to the concentrated post-thermal saline water that was formed in the course of its before said evaporation.

10. Claim 1, wherein the post-thermal saline water is flash vaporized in stages of decreasing temperature; the vapor of each stage is multiply compressed at increasing temperatures in cascade with the similarly compressed vapors of each of the stages; the finally compressed vapor from the stage of highest temperature comprises said regenerated steam and the saline water issuing from the stage of lowest temperature comprises said cooled, post-thermal saline water.

11. Claim 10, in which the post-thermal saline water is flash vaporized and the vapor multiply compressed in stages as described, while vapor from the stage of lowest temperature is uncompressed; the uncompressed vapor is combined with finally compressed vapor from the stage of highest temperature to form saturated steam comprising said regenerated steam; and the saline water issuing from said stage of lowest temperature comprises cooled post-thermal saline water.

12. Claim 1, wherein said cooled post-thermal saline water is further cooled while indirectly preheating the saline water; the further cooled post-thermal saline is evaporated in the successive stages of increasing saline water concentration of a multistage vapor compression evaporator; as to which evaporator, the vapor of each stage is compressed, and forms condensate while indirectly heating saline water; the condensates of each stage are combined to form evaporator condensate, while corresponding evaporator concentrate is comprised in the saline water exiting from the stage of highest concentration; and wherein said evaporator condensate and concentrate are cooled to produce respectively fresh water and saline water residuum.

13. Claim 12, in which sulfuric acid is added to the saline water in a stage of elevated, saline water concentration, the added sulfuric acid serving to prevent the hydrolytic precipitation of magnesium hydroxide during evaporation in said stage.

14. Claim 12, in which anhydrite is added to the saline water in a stage of elevated saline water concentration, the added anhydrite serving as seed for potential anhydrite precipitation during evaporation.

15. Claim 14, in which said before mentioned separated precipitate serves as said anhydrite.

16. Claim 12, in which magnesium hydroxide is added to the saline water in a stage of elevated concentration of saline water in said multistage vapor compression evaporator, the added magnesium hydroxide serving as seed for potential, hydrolytic precipitation of magnesium hydroxide during evaporation in said stage.

17. Claim 16, in which said magnesium hydroxide is produced by adding lime to concentrated saline water formed in the course of said evaporation.

18. A process for the conversion of saline water containing scale-forming compounds, which comprises indirectly preheating the saline water stepwise; forming preheated saline water in the final step; passing steam through the preheated saline water and condensing a part of the steam in direct contact with the preheated saline water, thereby further heating it, while issuing another part of the steam uncondensed; as a result of the further heating, thermally decomposing bicarbonates in the saline water and thereupon precipitating alkaline scale compounds, while liberating carbon dioxide derived from said bicarbonates, and precipitating calcium sulfate and other scale compounds; expelling carbon dioxide, comprising that which had been liberated and other carbon dioxide present in the saline water, by including it in said issuing, uncondensed steam; separating the precipitate of scale compounds from the further heated saline water, and therewith forming clarified saline water and separated precipitate; condensing the issued steam while it is in indirect contact with saline water being preheated in said final step, forming hot condensate of said steam and evolving its included carbon dioxide; cooling said clarified saline water; and evaporating cooled, clarified saline water to produce fresh water and saline water residuum.

19. The subject matter of claim 18, wherein evolved carbon dioxide is passed to the saline water to be indirectly preheated, whereby alkaline scale in preheating is prevented.

20. Claim 1, wherein said saline water is selected from among sea water, brackish water, and process and wastewaters that contain scale-forming compounds.

21. Claim 1, wherein said cooled, post-thermal saline water before passing to evaporation preheats said saline water.

* * * * *